United States Patent Office 3,335,180
Patented Aug. 8, 1967

3,335,180
COMPOSITION AND PROCESS
John P. Faust and Charles S. King, Hamden, and Andrew J. Klanica, Cheshire, Conn., assignors to Olin Mathieson Chemical Corporation, a corporation of Virginia
No Drawing. Filed Nov. 6, 1964, Ser. No. 409,570
4 Claims. (Cl. 260—551)

This invention relates to perfluorovinylborazines and to methods of preparing them.

The perfluorovinylborazines of this invention have the formula:

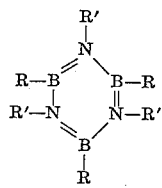
I where nitrogen and boron are both 4-covalent, where at least one R is perfluorovinyl, $CF_2=CF-$ and the remaining R and all the R' are alkyl of 1 to 5 carbons. More particular examples of suitable R and R', aside from perfluorovinyl, are methyl, ethyl, propyl, iso-propyl, butyl, iso-butyl, tert.-butyl and neopentyl.

The compound N,N',N" - triphenyl - B,B',B" - trivinylborazine has been reported in the literature indicating that the material could not be polymerized. See Pellon et al., J. Polymer Science, v. 55, pp. 153–60 (1961). Copolymers containing up to 99% by weight of this monomer (there termed a borazole) are disclosed in U.S. Patent 2,954,366 issued Sept. 27, 1960 to Pellon. In addition, U.S. Patents 2,892,689 and 2,954,361 disclose certain unsaturated borazines, there termed borazoles. In contrast to these disclosures are the novel perfluorovinylborazines of this invention.

The perfluorovinylborazines of this invention have utility in textile treatment. B - perfluorovinyl - pentamethylborazine and B,B',B"-trisperfluorovinyl-N,N',N"-trimethylborazine are unexpectedly outstanding to eliminate afterglow in burned textiles.

The perfluorovinylborazines of this invention are prepared by various methods. One suitable method comprises the dropwise addition of the perfluorovinyl Grignard reagent, $CF_2:CFMgX$, where X represents Br or I, to a mixture, which may be a solution or a slurry of a borazine or a mono, di or trihaloborazine in an inert liquid, for example, ethers, dioxane, tetrahydrofuran, aromatic and aliphatic hydrocarbons and chlorobenzene.

The addition of the Grignard reagent to the borazine or haloborazine is carried out at temperatures of, for example, from about −78° C. up to the boiling point of the particular solvent employed. Addition of the Grignard reagent is completed during a period of up to about 3 hours, for example, from about ½ to 2 hours. The reaction mass is allowed to reflux or is kept at a temperature at or above room temperature for a period of from a few minutes to several hours. After cooling to room temperature the unconsumed Grignard reagent is removed by any suitable means, for example, addition of a cold, aqueous solution of ammonium chloride.

The desired product is recovered by distillation of the solvent under vacuum from the reaction mass, taking up the residue in hot hexane or other inert solvent. The solution is washed with a small amount of water, dried and concentrated to a volume such that the perfluorovinylborazine separates on cooling. This is then filtered off and dried.

The perfluorovinyl alkalies, suitably prepared from perfluorovinyl bromide or iodide, are appropriate reagents in place of the Grignard reagent for reaction with the haloborazines to form the perfluorovinylborazines of this invention. Examples include perfluorovinyl lithium, perfluorovinyl sodium and perfluorovinyl potassium. The perfluorovinyl compounds of the other alkali metals are also suitable. The perfluorovinyl compounds of the divalent metals, tin and lead are also suitable. Examples of these include $(CF_2=CF)_2Mg$, $(CF_2=CF)_2Hg$ and $(CF_2=CF)_4Sn$.

It is frequently more convenient, instead of first preparing the perfluorovinyl alkali compound, to use a mixture of reagents, in effect preparing the perfluorovinyl alkali in situ with the appropriate haloborazine. Suitably a simpler alkyl metal compound, preferably an alkali metal alkyl, is added to a mixture, in an inert liquid, of perfluorovinyl bromide or perfluorovinyl iodide with the appropriate haloborazine. For this purpose, suitable alkyl metal compounds include those of the alkali metals, Group II metals, tin and lead. Examples include:

Methyl lithium
Butyl lithium
Ethyl sodium
N-propyl potassium
Dimethyl beryllium
Diethyl beryllium
Diphenyl beryllium
Diethyl magnesium
Diphenyl magnesium
Diethyl strontium
Diphenyl barium
Di-n-butyl barium
Dimethyl zinc
Diphenyl zinc
Diethyl cadmium
Dimethyl cadmium
Dimethyl mercury
Tetramethyl tin
Tetramethyl lead The method of preparing the perfluorovinylborazines of this invention thus comprises reacting a borazine having the formula:

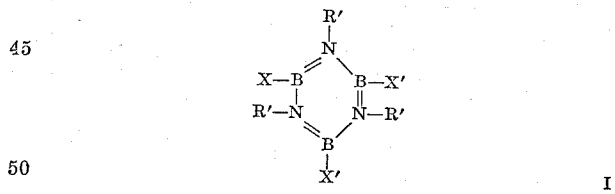
I in which R' is alkyl of 1 to 5 carbons, X is hydrogen, chlorine or bromine and X' is hydrogen, chlorine, bromine or alkyl of 1 to 5 carbons, with a perfluorovinyl metal compound in an inert liquid reaction medium and separating the perfluorovinylborazine from the resultant mixture. The method is suitably carried out with preformed perfluorovinyl metal perfluorovinylating agent or the perfluorovinyl metal agent is formed in situ when an alkyl metal compound is added to a mixture of perfluorovinyl bromide or iodide and the haloboron-nitrogen heterocycle in an inert liquid reaction medium.

EXAMPLE I

B,B',B"-trisperfluorovinyl-N,N',N"-trimethylborazine

A four neck, 500 milliliter, round bottom flask, was dried in a vacuum oven for several hours at 100° C. and 60 mm. pressure. Two 125 ml. addition funnels and one 300 ml. cold finger condenser were also dried in the vacuum oven with the reactor. The reactor, addition funnels and cold finger condenser were assembled. The condenser was vented to a line equipped for vacuum or for the addition of dry nitrogen to the reactor system. The reactor and attached apparatus were then evacuated and filled with dry nitrogen gas.

One addition funnel was charged with 3 g. of B-trichloro-N-trimethylborazine dissolved in 65 ml. of dry diethyl ether. The second addition funnel was charged with 0.87 g. of methyl lithium dissolved in 65 ml. of dry diethyl ether.

A Teflon coated magnetic stirring bar was placed in the reactor and the cold finger condenser was cooled to −78° C. with a Dry Ice-acetone mixture. The dry nitrogen in the reactor was then pumped out and 7.0 g. of perfluorovinyl bromide was condensed into the reactor. The reactor contents were stirred for about 15 minutes.

10 ml. of the methyl lithium-ether solution was then added to the reactor followed 30 seconds later by the addition of 10 ml. of the borazine-ether solution. The reactor contents were stirred for 5 minutes. This mode of reactant addition was repeated until all of the reactants were added. The reactants were stirred constantly during the additions and the reactor temperature was maintained at −78° C.

After the reactant additions were completed, the reactor contents were stirred for an additional hour. The reactor contents were then warmed slowly over a period of two hours to 25° C. A very fine precipitate formed in the reactor during the warming period from −78° C. to 25° C.

The reactor contents were stirred for an additional 16 hours at 25° C. and then filtered in a nitrogen dry box. The solid product was analyzed by X-ray powder pattern. The solid was identified as lithium chloride.

The filtrate was placed in a 200 ml. round bottom flask and the ether was distilled off leaving a dark brown solid wetted with a high boiling liquid. This high boiling liquid was distilled off at 0.3 mm. mercury and about 150–200° C. and collected in a receiver cooled to −78° C. About 2 ml. of pale yellow liquid was collected. This liquid product was identified by infra-red spectrophotometry, mass spectrophotometry, nuclear magnetic resonance, and elementary analysis as B-trisperfluorovinyl-N-trimethylborazine.

EXAMPLE II

*B-perfluorovinyl-B′,B″-dimethyl-N,N′,N″-trimethylborazine*

The apparatus and supporting equipment was essentially the same as described in Example I. The assembled, dry, apparatus was evacuated and filled to atmospheric pressure with dry nitrogen gas. 15 ml. of dry diethyl ether was placed in the reactor with a Teflon coated magnetic stirring bar. A Dry Ice-acetone bath was placed around the reactor and the cold finger condenser was cooled to −78° C. with a Dry Ice-acetone mixture. The reactor was then evacuated to about 200 mm. Hg and 1.43 g. (89 millimoles) of perfluorovinyl bromide was condensed into the reactor. The reactor pressure was then increased to 760 mm. Hg with dry nitrogen gas and the reactor contents were stirred vigorously at −78° C.

Methyl lithium (0.13 g.; 5.9 millimoles) dissolved in 15 ml. of dry diethyl ether was placed in one addition funnel which was attached to the reactor. B-chloro-B,B′-dimethyl-N-trimethylborazine (1.1 g.; 5.9 millimoles) dissolved in 15 ml. of dry diethyl ether was placed in the second addition funnel which was attached to the reactor.

While the reactor was cooled to −78° C., 5 ml. of the methyl lithium solution was added to the reactor followed 30 seconds later by the addition of 5 ml. of the B-chloro-B,B′-dimethyl-N-trimethylborazine-ether solution. The reactor contents were stirred vigorously for 5 minutes. This addition sequence was repeated until all of the reactants were added.

The reactor contents were then stirred at −78° C. for an additional 1½ hours and then warmed slowly over a period of 3½ hours to 25° C. A fine precipitate formed in the reactor. The reactor contents were then filtered in a nitrogen dry box and the solid separated by filtration was identified as lithium chloride by X-ray powder pattern. A light brown solid wetted with a high boiling liquid remained in the flask. This high boiling liquid was vaporized at 0.03 mm. Hg and approximately 150° C. and the vapors were collected into a second 100 ml. round bottom flask cooled to −78° C.

The liquid product was identified as B-perfluorovinyl-B′,B″-dimethyl-N,N′,N″-trimethylborazine by infra-red spectrophotometry, mass spectrophotometry, and nuclear magnetic resonance.

EXAMPLE III

*Afterglow tests*

A 10 percent solution of each of the products of Examples I and II was prepared by dissolving (1) 0.75 g. of the product of Example I in 6.75 g. diethyl ether and (2) 0.3 g. of the product of Example II in 2.7 g. ether. Strips 2 cm. x 5 cm. of bleached, mercerized 80 x 80 cotton print were immersed in the solution, removed and then dried by heating under vacuum.

The impregnated strips were burned and the afterglow timed with a stop watch. The duration of the afterglow was compared to that of identical pieces of the same cloth which had been treated with diethyl ether alone and then dried. The results are listed below.

DURATION OF AFTERGLOW

| Sample No. | Standard Cloth | Cloth treated with Product of Example I | Cloth treated with Product of Example II |
|---|---|---|---|
| 1 | 6 sec | 0 sec | 0 sec |
| 2 | 8 sec | 0 sec | 0 sec |
| 3 | 8 sec | 0 sec | 0 sec |

It is apparent that afterglow was completely eliminated.
What is claimed is:
1. A perfluorovinylborazine having the formula:

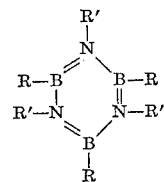

where at least one R is perfluorovinyl, the remaining R and all of the R′ are alkyl of 1 to 5 carbons.

2. B - perfluorovinyl - B′,B″ - dimethyl - N,N′,N″ - trimethylborazine.

3. B,B′,B″ - trisperfluorovinyl - N,N′,N″ - trimethylborazine.

4. Method of preparing a compound as claimed in claim 1 by reacting (1) a perfluorovinylhalide selected from the class consisting of the bromide and iodide, (2) a metal organic compound selected from the class consisting of a lower alkyl metal compound and a phenyl metal compound wherein said metal is one selected from the class consisting of an alkali metal, a Group II metal, tin and lead and (3) a borazine having the formula

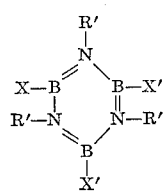

wherein R' is alkyl of 1 to 5 carbons, X is selected from the group consisting of hydrogen, chlorine and bromine and X' is selected from the group consisting of hydrogen, chlorine, bromine and alkyl of 1 to 5 carbons, in an inert liquid reaction medium and separating the perfluorovinylborazine product from the resultant mixture.

References Cited

UNITED STATES PATENTS 2,954,401   9/1960   Groszos et al. _____ 260—551

WALTER A. MODANCE, *Primary Examiner.*

HARRY I. MOATZ, *Assistant Examiner.*